United States Patent [19]

Staehs et al.

[11] Patent Number: 5,267,514
[45] Date of Patent: Dec. 7, 1993

[54] TRACK FOR MATERIAL HANDLING CAR AND CAR WHEEL ASSEMBLY FOR COOPERATION THEREWITH

[75] Inventors: Joel L. Staehs, DeSoto; Charles A. Kemp, Richardson; Gene DiFonso, Arlington, all of Tex.; William C. Bortzfield, late of Grand Prairie, Tex., by Beverly J. Bortzfield, executrix

[73] Assignee: BAE Automated Systems, Inc., Carrollton, Tex.

[21] Appl. No.: 967,805

[22] Filed: Oct. 28, 1992

[51] Int. Cl.⁵ ............................................. B61D 3/00
[52] U.S. Cl. ...................................... 104/246; 104/106; 104/292; 104/245; 105/170
[58] Field of Search ............... 104/106, 107, 108, 109, 104/124, 139, 290, 292, 245, 246, 247, 248; 105/215.1, 170

[56] References Cited

U.S. PATENT DOCUMENTS

| | | | |
|---|---|---|---|
| 745,855 | 12/1903 | Jackman | 104/247 |
| 1,197,260 | 9/1916 | Brown | 104/248 |
| 1,755,030 | 4/1930 | Schmeck | 104/247 |
| 1,825,468 | 9/1931 | Miller | 104/247 |
| 3,231,066 | 1/1966 | Harrison et al. | 198/155 |
| 3,265,190 | 8/1966 | Boehm | 198/155 |
| 4,919,054 | 4/1990 | Matsuo | 104/94 |
| 5,018,928 | 5/1991 | Hartlepp | 414/339 |

FOREIGN PATENT DOCUMENTS

| | | | |
|---|---|---|---|
| 0595087 | 3/1960 | Canada | 105/170 |
| 0052606 | 3/1988 | Japan | 104/292 |
| 0231902 | 9/1990 | Japan | 104/292 |
| 024056 | of 1908 | United Kingdom | 104/246 |

*Primary Examiner*—Mark T. Le
*Attorney, Agent, or Firm*—Lorusso & Loud

[57] ABSTRACT

A material handling car and track assembly, the assembly comprising a track having a pair of opposed U-shaped rails, and a car having a chassis with four wheel assemblies mounted on the chassis, each of the wheel assemblies comprising a first generally vertical travel wheel movable along a bottom plate portion of the rail, a second generally horizontal travel wheel engagable with a side wall portion of the rail, and a wear block engagable with a top plate portion of the rail.

7 Claims, 4 Drawing Sheets

TRACK FOR MATERIAL HANDLING CAR AND CAR WHEEL ASSEMBLY FOR COOPERATION THEREWITH

BACKGROUND OF THE INVENTION

1. Field of the Invention

This invention relates to a material handling car and track assembly and is directed more particularly to a track configuration and a car wheel assembly for cooperation with the track to keep the car on the track.

2. Description of the Prior Art

It is known generally in car and track systems to utilize opposed U-shaped channel members as track rails and to provide both horizontal and vertical wheels on the car. In such arrangements, the vertical wheels usually serve as main travel wheels and the horizontal wheels ride along the inboard vertical walls of the channel members to keep the travel wheels centered on the rails.

In U.S. Pat. No. 3,265,190, issued Aug. 9, 1966, to Walter G. Boehm, there is disclosed a car adapted to travel on opposed U-shaped channel members. The car is provided with two vertical travel wheels on each side of the car which are disposed within a track channel member. Between each pair of travel wheels on a side is a horizontal roller which engages an inboard upper edge of the channel member.

U.S. Pat. No. 3,231,066, issued Jan. 25, 1966 to Walter G. Harrison, et al., discloses a car adapted to move on parallel rails. The car is provided with four vertical wheels for riding on horizontal rail portions, and a single horizontal wheel, disposed centrally of the car, for contacting vertical rail means disposed between the parallel rails.

In U.S. Pat. No. 4,919,054, issued Apr. 24, 1990, to Yukito Matsuo, there is disclosed a car adapted to run on opposed U-shaped rails. In one embodiment, each car is provided with four pairs of vertical wheels. In each pair of vertical wheels, there is a lower wheel for engaging a bottom plate portion of the rail and an upper wheel for engaging a top plate portion of the rail. Associated with each pair of vertical wheels, but spaced therefrom along the length of the car is a horizontal wheel adapted to engage a vertical plate portion of the rail.

In Matsuo, the car is propelled by a linear induction motor, disposed well beneath the level of the rails, acting upon a vane depending from the car and adapted to pass through a slot in the motor, which imparts thrust to the vane, and thereby the car. Inasmuch as the vane is disposed well below the wheels of the car, each thrust forward on the vane imparts a turning moment on the car, a stress which, experienced thousands of times, causes undue wear on the car and the rails.

SUMMARY OF THE INVENTION

An object of the present invention is to provide a generally U-shaped track rail configuration and a car wheel assembly for cooperation with the track configuration.

A further object of the invention is to provide a track having two parallel opposed generally U-shaped rails, and a car having four independent wheel assemblies, each wheel assembly having a vertical travel wheel for rolling on a bottom plate portion of a rail, a horizontal wheel for rolling engagement with a vertical plate portion of the rail, and a wear block adapted to engage an undersurface of a top portion of the rail in the event a capsizing force is applied to the car, as by collision, or the like, to prevent the car from leaving the rails.

A still further object of the invention is to provide a car and track assembly in which a thrust means disposed between parallel track rails in substantially abreast of the wheel assemblies, such that a forward thrust is imparted to the car in the area of the wheels, virtually eliminating any turning moment imparted to the car.

With the above and other objects in view, as will hereinafter, a feature of the present invention is the provision of a material handling car and track assembly, the assembly comprising a track having a pair of parallel rails, each of the rails comprising a bottom plate, a side wall upstanding from the bottom plate, and a top plate extending inwardly from the side wall and overlying the bottom plate, the assembly further comprising a car having a chassis, and four wheel assemblies mounted on the chassis, each of the wheel assemblies comprising a first travel wheel disposed vertically and rotatable about a horizontal axis, the first travel wheel being engaged with the bottom plate for rolling thereon, a second travel wheel disposed horizontally and rotatable about a vertical axis, the second travel wheel being engagable with the side wall for rolling thereon, a strut disposed in part between the bottom plate and the top plate and proximate the top plate, and a wear block on a free end of the strut adapted to engage an undersurface of the top plate to prevent capsizing of the car.

In accordance with a further feature of the invention, there is provided a wheel assembly for a car adapted to move along a track system, the wheel assembly comprising a substantially vertical spindle adapted for pivotal attachment to the car chassis, a wheel support member fixed to one end of the spindle, a substantially vertical wheel rotatably mounted in the wheel support member, and a substantially horizontal wheel rotatably mounted on the spindle.

In accordance with a still further feature of the invention, there is provided a material handling car and track assembly, the assembly comprising a track having a pair of parallel opposed U-shaped rails, and a car having four wheel assemblies mounted thereon for support and movement of the car on the rails, each of the wheel assemblies including a first travel wheel in a substantially vertical disposition and a second travel wheel in a substantially horizontal disposition, a vane depending from an underside of the car and extending between the rails and extending front to rear of the car along a centerline of the car, a pair of opposed linear motors mounted on the track between the rails, the motors being spaced from each other to define a slot therebetween, the vane being adapted to pass through the slot, the motors being adapted to impart a forward thrust to the vane, and thereby the car, when the vane passes through the slot, the vane and the motors being disposed between the first and second travel wheels on a first side of the car and the first and second travel wheels on a second side of the car, whereby the thrust is imparted to the car substantially abreast of the travel wheels.

The above and other features of the invention, including various novel details of construction and combinations of parts, will now be more particularly described with reference to the accompanying drawings and pointed out in the claims. It will be understood that the particular devices embodying the invention are shown by way of illustration only and not as limitations of the invention. The principles and features of this invention may be employed in various and numerous embodiments without departing from the scope of the invention.

BRIEF DESCRIPTION OF THE DRAWINGS

Reference is made to the accompanying drawings in which are shown illustrative embodiments of the invention, from which its novel features and advantages will be apparent.

In the drawings.

DESCRIPTION OF THE PREFERRED EMBODIMENTS

Figure 1:
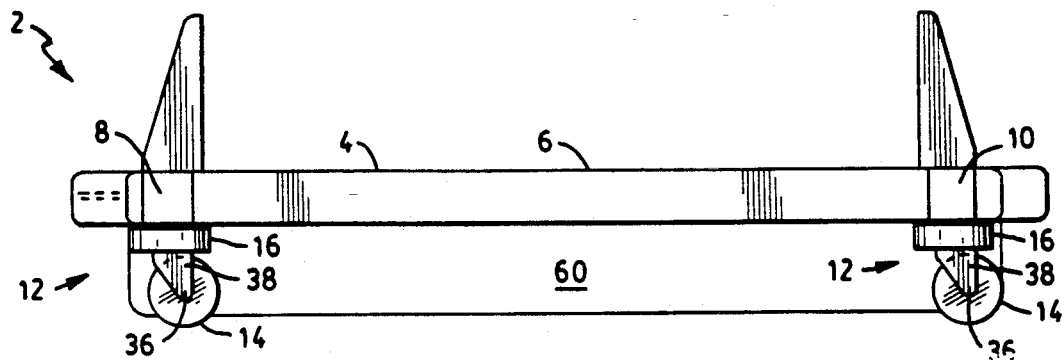
FIG. 1 is a side elevational view of a chassis portion of a material handling car of the type with which the present invention finds facility.
Figure 2:
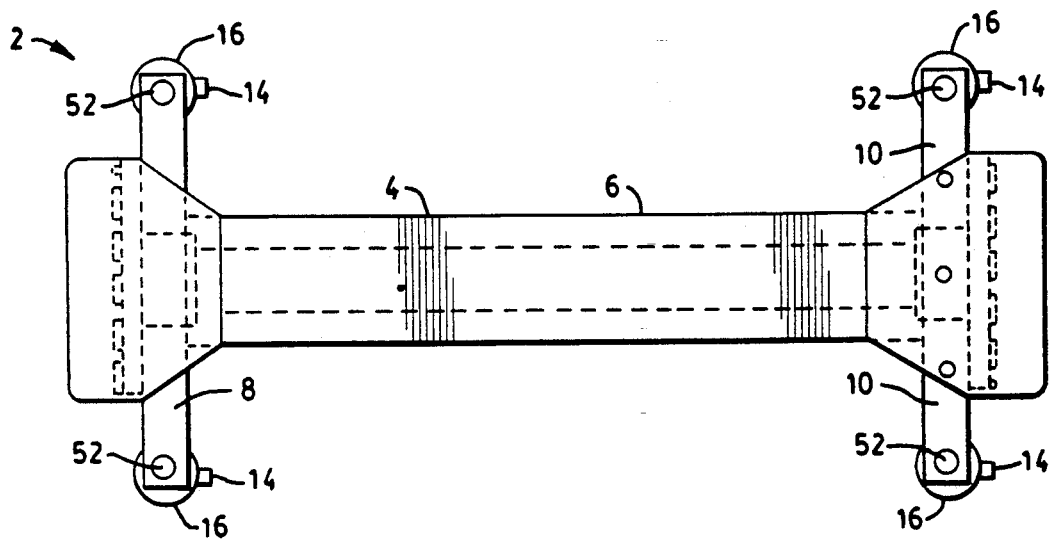
FIG. 2 is a top view thereof.

Referring to FIGS. 1 and 2, it will be seen that a chassis portion 2 of the material handling car of the type movable upon a track having parallel rails, and for the purpose of conveying materials, as for example, pieces of luggage, from one point to another at an airport, or other such facility, includes a frame 4, comprising a central portion 6 and fixed thereto front and rear cross-members 8, 10.

Near each end of the cross members 8, 10, there is pivotally attached to the cross member a wheel assembly 12 including a substantially vertical first travel wheel 14 and a substantially horizontal second travel wheel 16.

Figure 3:
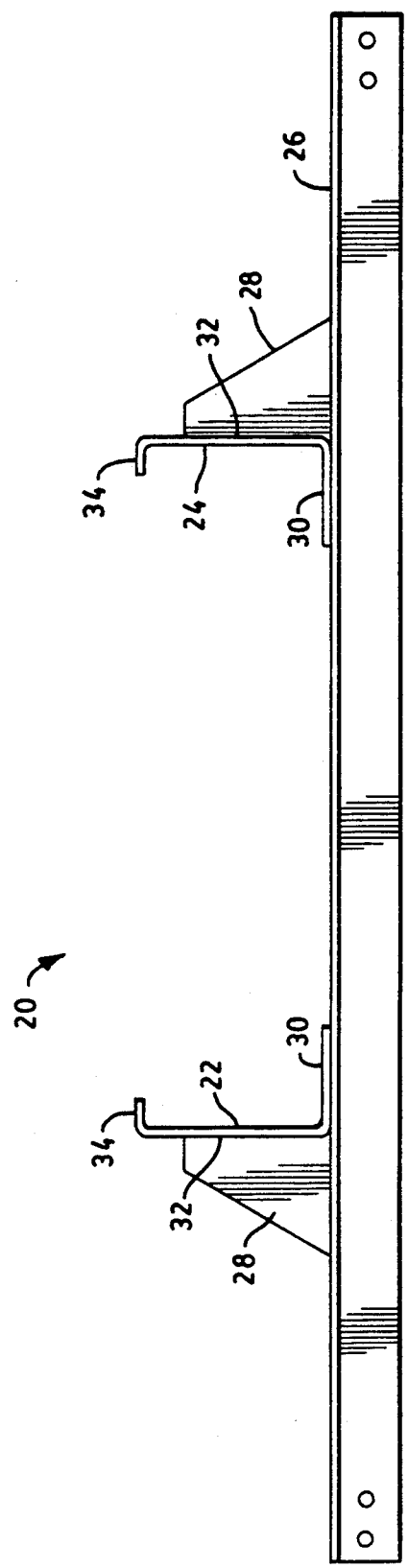
FIG. 3 is an elevational end view of a section of track adapted for cooperation with the chassis of FIGS. 1 and 2.

Referring to FIG. 3, it will be seen that a track assembly 20, suitable for use in conjunction with the car chassis 2, includes a pair of parallel opposed u-shaped rails, 22, 24, mounted on a support member 26 and braced by brace members 28. Each rail 22, 24 includes a bottom plate 30, a side wall 32 upstanding from the bottom plate 30, and a top plate 34 extending inwardly from a top edge of the side wall and overlying a portion of the bottom plate.

Figure 4:
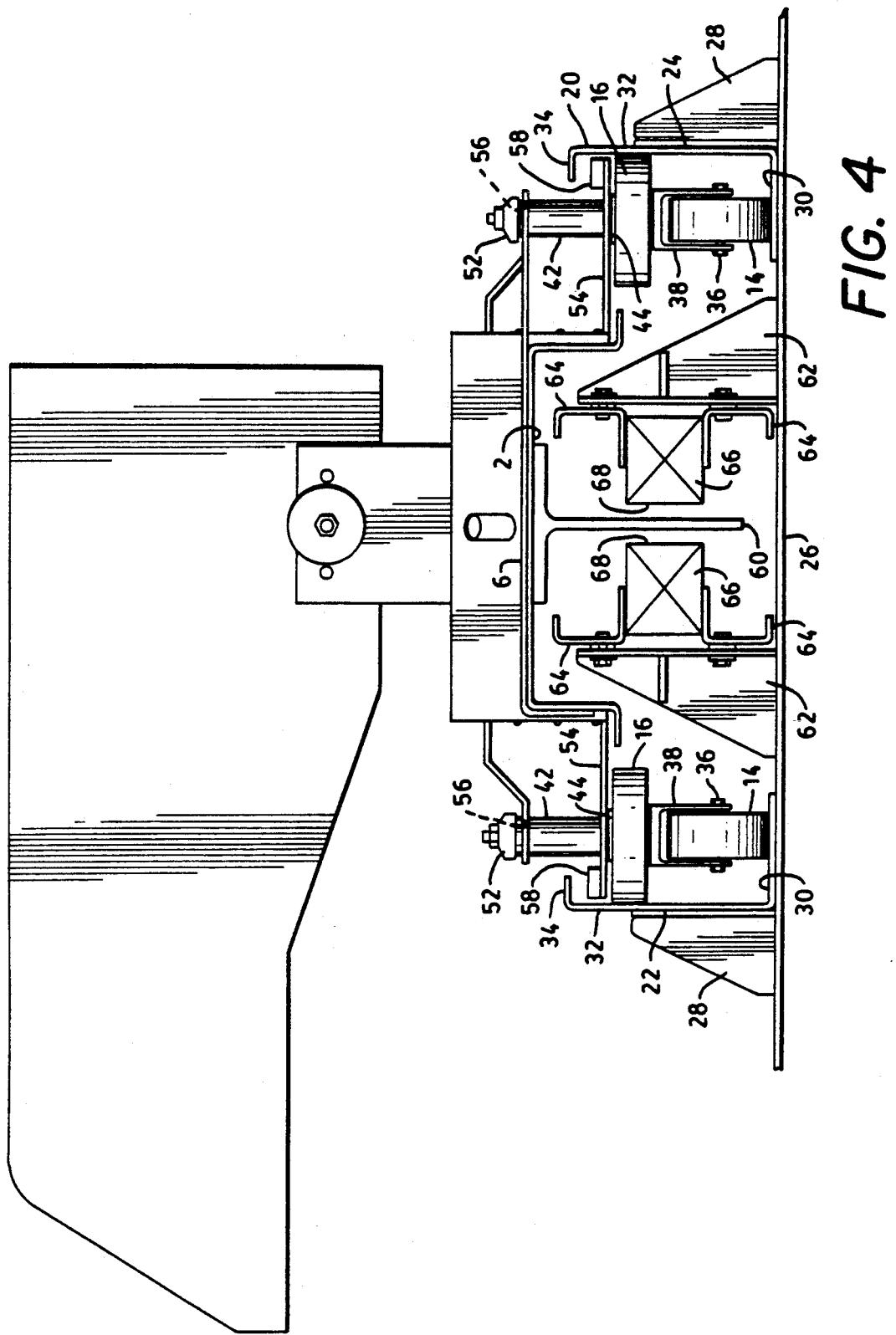
FIG. 4 is a front elevational view of the material handling car, including the chassis portion of FIGS. 1 and 2, in combination with a section of track as shown in FIG. 3, illustrative of a feature of the invention.

Referring to FIG. 4, it will be seen that the wheel assembly first travel wheel 14 rides upon, and is supported by, the rail bottom plate 30. The first travel wheels 14 are disposed generally vertically and rotate about generally horizontal axles 36. It is understood that track sections may be banked slightly and that the designation "vertical" and "horizontal" are for descriptive purposes only and will not hold true when the track itself is other than horizontal.

Figure 5:
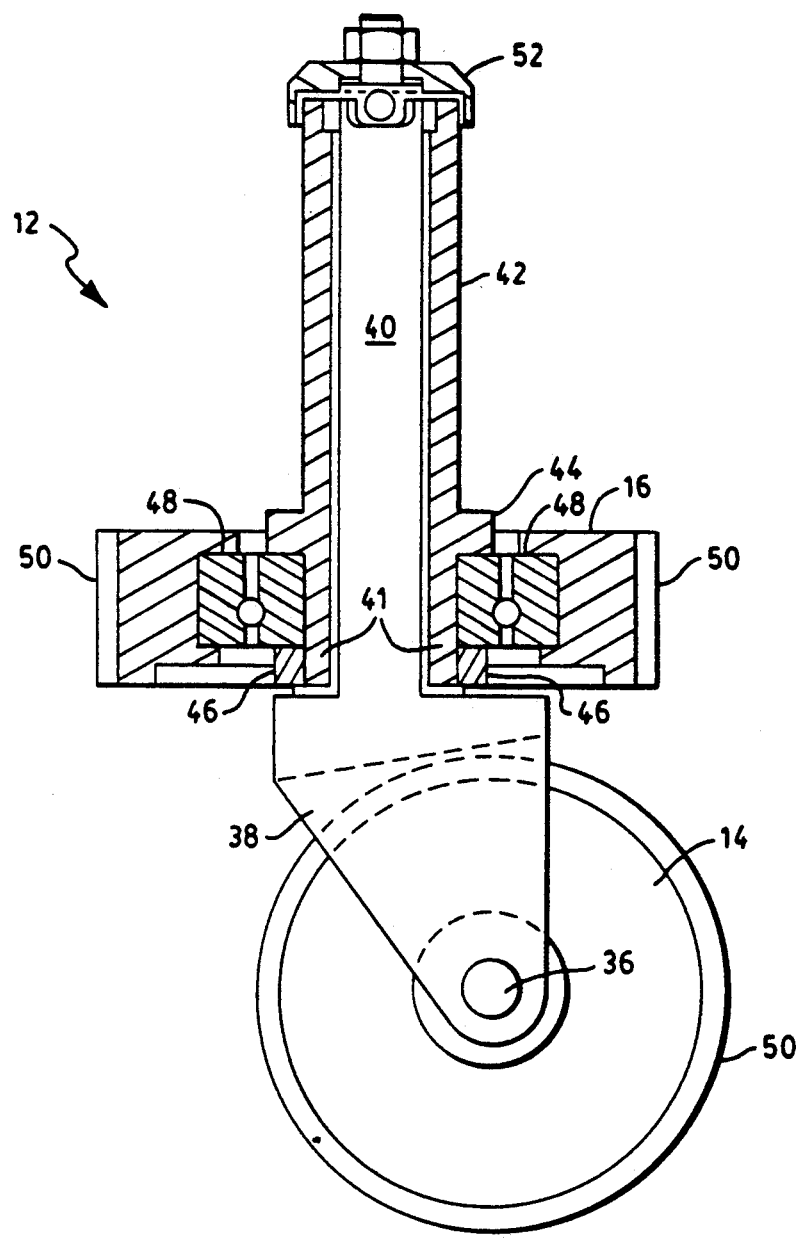
FIG. 5 is an elevational, partly sectional, side view of a single wheel assembly, illustrative of another feature of the invention.

Each of the first travel wheels 14 is rotatably mounted in a U-shaped wheel support member 38 (FIGS. 4 and 5) which has extending therefrom a cylindrically shaped spindle 40 (FIG. 5). Mounted on the spindle 40 is a sleeve 42 with an annular flange 44 extending radially outwardly therefrom. Around a lower end 41 of the sleeve 42 there is disposed a sleeve 46 which extends downwardly beyond the lower end 41 of the sleeve 42 and engages the wheel support member 38. Between the flange 44 and the sleeve 46 there are disposed ball bearings 48 on the sleeve 42, the ball bearings 48 being mounted in the generally horizontal second travel wheel 16, which is substantially normal to the first travel wheel and rotatable about the generally vertical axis of the sleeve 42. Each of the travel wheels 14, 16 may be provided with a wear ring 50 which enables the wheels to roll relatively noiselessly along the respective surfaces of the bottom plate 30 and the side wall 32. A cap member 52 is releasably secured to the upper end of the spindle 40 to hold the sleeve 42 on the spindle 40.

As may be seen in FIG. 4, with each wheel assembly there is associated a strut 54 extending from the frame central portion 6. The strut 54 is provided with a hole 56 therein through which extends the spindle 40 and the sleeve 42. The strut 54 rests upon an upper surface of the flange 44. At a free end of the strut 54 is a wear block 58 of a low friction polymer material. The wear block extends to a point beneath the track rail top plate 34 and is adapted to engage an undersurface of the top plate upon lifting of the travel wheel 14 off the bottom plate 30.

Depending from the car chassis portion 2 is a vane 60 (illustrated in FIGS. 1 and 4.) extending along the front-to-rear axis of the chassis. Mounted on the track support member 26 between the rails 22, 24 are brackets 62 to which are fixed retainer members 64 adapted to retain opposed linear motors 66. As the car moves along the rails 22, 24 the vane 60 passes through slots 68 defined by the spacing apart of the opposed linear motors 66. The linear motors 66 act to thrust the car forwardly, the car having no power means of its own onboard. Inasmuch as the thrusting impulse is applied at substantially the level of the travel wheels, there is virtually no turning moment imposed upon the car.

In operation, as the car is thrust along the rails 22, 24 by the action of the linear motors 66 on the vane 60, the four first travel wheels 14 roll upon upper surfaces of the rail bottom plates 30. The second travel wheels 16 are spaced only slightly from inboard surfaces of the side walls 32 when the car is centered on the track, a space on the order of 0.06 inch. Thus, upon the slightest deviation of the car from the center of the track, the appropriate second travel wheels 16 roll along the neighboring side wall 32. The second travel wheels 16 thus operate to keep the car centered so that the vane 60 is always in substantial alignment with the slots 68.

If the car for any reason is caused to rise off the rail bottom plate 30, as in high speed cresting of a rise, in high speed turns, or in a collision, the appropriate wear blocks 58 engage undersides of the neighboring top plates 34, to keep the car securely on the track.

There is thus provided a wheel assembly and a complementary track rail configuration which insure smooth, centered movement of the car along the track system, with the car securely retained by the track rails, and with a thrusting means for the car on the level of the wheels so as to avoid applying a turning moment to the car about the axles of the main travel wheels.

It is to be understood that the present invention is by no means limited to the particular construction herein disclosed and/or shown in the drawings, but also comprises any modifications or equivalents within the scope of the claims.

Having thus described our invention, what we claim as new and desire to secure by Letters Patent of the United States is:

1. A material handling car and track assembly, said assembly comprising a track having a pair of parallel rails, each of said rails comprising a bottom plate, a side wall upstanding from said bottom plate, and a top plate extending inwardly from said side wall and overlying said bottom plate, said assembly further comprising a car having a chassis, each of said wheel assemblies mounted on said chassis, each of said wheel assemblies comprising a first travel wheel disposed vertically and rotatable about a horizontal axis, said first travel wheel being engaged with said bottom plate for rolling thereon, a second travel wheel disposed horizontally and rotatable about a vertical axis, said second travel wheel being engageable with said side wall for rolling thereon, a strut disposed in part between said bottom plate and said top plate and proximate said top plate, and a wear block on a free end of said strut adapted to engage an undersurface of said top plate, wherein in each of said wheel assemblies said first travel wheel is mounted at one end of a generally vertical spindle mounted on said chassis and said second travel wheel is rotatably mounted on said second spindle, said spindle extending through the center of said second travel wheel.

2. The assembly in accordance with claim 1 wherein said strut extends outboard from said chassis and is provided with a hole therein, and said spindle extends through said hole.

3. The assembly in accordance with claim 1, and further comprising a vane fixed to said chassis and depending therefrom, said vane extending normal to the plane of said chassis and extending lengthwise of said chassis and along the centerline of said chassis, and linear motor means mounted on said track between said rails, said motor means defining a slot having a width exceeding the thickness of said vane such that said vane is adapted to pass through said slot defined by said motor means, such that said motor means are adapted to impart a forward thrust to said vane, and thereby said car, when said vane passes through said slot, said vane and said motor means being adapted to be disposed between said first and second travel wheels on a first side of said car and said first and second travel wheels on a second side of said car, whereby said thrust is imparted to said car substantially abreast of said travel wheels.

4. The assembly in accordance with claim 1 wherein said wear block is of polymer material.

5. A material having car and track assembly, said assembly comprising a track having a pair of parallel U-shaped rails, and a car having four wheel assemblies mounted thereon for support and movement of said car on said rails, each of said wheel assemblies including a first travel wheel in a substantially vertical disposition and a second travel wheel in a substantially horizontal disposition, a vane depending from an underside of said car and extending between said rails and extending front-to-rear of said car along a centerline of said car, a pair of opposed linear motors mounted on said track between said rails, said motors being spaced from each other to define a slot therebetween, aid vane being adapted to pass through said slot, said motors being adapted to impart a forward thrust to said vane, and thereby said car, when said vane passes through said slot, said vane and said motors being adapted to be disposed between travel wheels on said car, whereby said thrust is imparted to said car substantially abreast of said travel wheels, wherein each of said rails is provided with a bottom plate, a side wall upstanding from said bottom plate, and a top plate extending inwardly from said side wall and overlying said bottom plate, said first travel wheel being engaged with said bottom plate for rolling thereon, and said second travel wheel being engageable with said side wall for rolling thereon, said second travel wheels acting to maintain said car in a centered position on said rails, such that said vane is substantially aligned with said slot, and wherein each of said wheel assemblies further includes a strut extending from a frame portion of said car and disposed in part between said second travel wheel and said top plate, and a wear block on a free end of said strut adapted to engage an undersurface of said top plate, wherein in each of said wheel assemblies said first travel wheel is mounted at one end of a generally vertical spindle mounted on said car, and said second travel wheel is rotatably mounted on said spindle, with said spindle extending through the center of said second travel wheel.

6. The assembly in accordance with claim 5 wherein said strut is provided with a hole therein and said spindle extends through said hole.

7. The assembly in accordance with claim 5 wherein said wear block is of polymer material.

* * * * *

UNITED STATES PATENT AND TRADEMARK OFFICE
CERTIFICATE OF CORRECTION

PATENT NO. : 5,267,514
DATED : Dec. 7, 1993
INVENTOR(S) : Joel L. Staehs, et al

It is certified that error appears in the above-indentified patent and that said Letters Patent is hereby corrected as shown below:

Col. 5, line 25, after "said", first occurrence, delete "second";

Col. 6, line 5, after "material" delete "having" and insert therefore --handling--; and Col. 6, line 17, after "therebetween," delete "aid" and insert therefore --said--.

Signed and Sealed this

Third Day of May, 1994

Attest:

BRUCE LEHMAN

*Attesting Officer*  *Commissioner of Patents and Trademarks*